United States Patent [19]

Ito et al.

[11] 4,137,020
[45] Jan. 30, 1979

[54] DIAPHRAGM TYPE AIR PUMP

[75] Inventors: Mikiji Ito, Nagoya; Naohiro Naganuma; Shojiro Nagano, both of Kariya, all of Japan

[73] Assignee: Nippondenso Co., Ltd., Kariya, Japan

[21] Appl. No.: 863,580

[22] Filed: Dec. 22, 1977

[30] Foreign Application Priority Data

Dec. 26, 1976 [JP] Japan .............................. 51-174666[U]
Feb. 4, 1977 [JP] Japan .............................. 52-12847[U]

[51] Int. Cl.² .......................... F04B 45/04; F16J 15/00
[52] U.S. Cl. ...................................... 417/534; 417/470; 74/18.1
[58] Field of Search ............... 417/470, 471, 534, 439; 74/18.1

[56] References Cited

U.S. PATENT DOCUMENTS

| 1,787,700 | 1/1931 | Persons | 417/439 |
|---|---|---|---|
| 3,208,394 | 9/1965 | Taplin | 74/18.1 |
| 3,223,045 | 12/1965 | Shope | 417/471 |
| 3,252,924 | 5/1966 | Johnson et al. | 417/471 |
| 3,281,065 | 10/1966 | Chaffiotte | 74/18.1 |
| 3,954,352 | 5/1976 | Sakai | 417/470 |

FOREIGN PATENT DOCUMENTS 880481  3/1943  France .................... 417/471

Primary Examiner—William L. Freeh
Attorney, Agent, or Firm—Cushman, Darby & Cushman

[57] ABSTRACT

A diaphragm is interposed between first and second housings to form first and second diaphragm chambers at both sides thereof for pumping out air in accordance with expansion and contraction of the chambers. A shaft for reciprocally moving the diaphragm is connected thereto at one end and extends through a hole formed in a bushing which is fixed to the second housing. A lever is pivotally secured to the housing to perform a pivotal movement and operatively connected at its inner end to the other end of the shaft in a lever compartment of the housing and at its outer end to an eccentric cam formed on an engine crankshaft, so that the motion of the cam is transmitted to the shaft as the reciprocal movement through the pivotal movement of the lever. A bellows is disposed in the second diaphragm chamber surrounding a portion of the shaft, wherein the upper and lower ends are respectively and air-tightly connected to the diaphragm and the bushing to form a bellows chamber. An axially extending groove is formed on either the inner surface of the hole or the outer surface of the shaft, so that the bellows chamber is communicated with the lever compartment by the groove. The compartment is communicated with an engine crankcase and thereby filled with a large amount of engine oil mist. The bellows chamber is also subjected to expansion and contraction in accordance with the reciprocal movement of the shaft to alternately draw into and force out air in the compartment, so that a portion of the mist is forcibly introduced into the groove to lubricate the shaft and the bushing.

3 Claims, 6 Drawing Figures

DIAPHRAGM TYPE AIR PUMP

BACKGROUND OF THE INVENTION

The present invention relates to a diaphragm type air pump used in an automotive vehicle for supplying air as a secondary air to an exhaust system of the engine for the purpose of reducing harmful components in the exhaust gases emitted from the engine.

A vane type air pump is generally and conventionally used for supplying the secondary air to the exhaust system of the engine, which is driven by the engine through a pulley fixed to an engine crankshaft and a belt. In recent years, however such a method or system has been proposed and widely used, which draws air into the exhaust pipe through a check valve such as a reed valve as the secondary air as a function of negative pressures produced in the exhaust pipe because of pulsating exhaust back pressures. Because the engine is supplied with and driven by lean air-fuel mixtures from view points of emission control and fuel consumption, and thereby the amount of the secondary air drawn into the exhaust system through the check valve is sufficient for the purpose of reducing the harmful components.

However, since the amount of the air drawn into the exhaust pipe through the reed valve is dependent on the negative pressures caused by the pulsating back pressures in the exhaust pipe, it is affected by the opening and closing timings of the exhaust valve, the shape and dimension of the exhaust pipe and so on. So some types of engines may run short of the secondary air. Such types of engines therefore require means for compulsorily feeding air to the exhaust pipe, even though the engines are operated with lean air-fuel mixtures.

When the conventional vane type air pump is used in such engines operated with lean mixtures, the capacity of the pump is too large. On the other hand, the vane type air pump has a disadvantage in that the smaller the capacity of the pump is made, the worse the efficiency becomes.

In view of the above problems, a diaphragm type air pump has been proposed instead of the vane type one. However, since the conventional air pump of the type is driven by the engine through the pulley and belt, it is required to install the pump in the engine compartment at such a place where the pulley of the engine crankshaft and the pulley of the pump are coplanar. On the other hand, many other automotive engine equipments such as an alternator, a radiator fan, a compressor for air conditioners and so on are also necessary to be installed in the engine compartment in the coplanar places with the pulley of the engine crankshaft.

It is therefore pretty hard for the air pump driven by the engine through the pulley and belt to provide a space therefor in the engine compartment, and it is disadvantageous in that the provision of the air pump increases flow resistance of cooling air for the radiator with the resultant increase of the temperature in the engine compartment.

SUMMARY OF THE INVENTION

It is, therefore, an object of the present invention to provide a diaphragm type air pump which is driven by an engine through a lever performing a pivotal movement, and thereby it is not necessary to drive the pump through the pulley and belt and to install the same in the coplanar place with the pulley of the engine crankshaft.

It is another object of the invention to provide a diaphragm type air pump which is simple and small in construction. According to one aspect of the invention, a diaphragm is interposed between first and second housings to respectively define first and second diaphragm chambers at both sides thereof. Inlet and outlet openings are respectively formed in the housings opening to the respective chambers, and inlet and outlet valve members are provided to open and close the associated openings in accordance with expansion and contraction of the diaphragm chambers. A shaft is reciprocally received in the second housing and connected at one end to the diaphragm and at the other end to an inner end of a lever which is pivotally fixed to the housing. The outer end of the lever is operatively connected to an eccentric cam formed on a crankshaft of an engine, so that the lever is driven by the engine to perform a pivotal movement thereof. The pivotal movement is transmitted to the diaphragm through the shaft to cause expansion and contraction of the diaphragm chambers to pump out air.

According to another aspect of the invention, a bushing is provided in the second housing and has a through hole through which the shaft extends. An axially extending groove is formed on either the inner surface of the groove or the outer surface of the shaft. A bellows is disposed in the second diaghragm chamber surrounding a portion of the shaft and forms a bellows chamber which is air-tightly isolated from the second diaphragm chamber. The bellows chamber is also subjected to expansion and contraction alternately in accordance with the reciprocal movement of the diaphragm. A lever compartment is formed in the housing in which the lever is pivotally received and the inner end thereof is operatively connected to the other end of the shaft. The compartment is communicated with the bellows chamber by the axially extending groove. Since the compartment is communicated with a crankcase of the engine, it is filled with a large amount of engine oil mist or vapour. Accordingly, a portion of the mist is forcibly drawn into the bellows chamber through the groove in accordance with the expansion thereof, so that lubrication between the bushing and the shaft is forcibly carried out.

According to a further aspect of the invention, the lever is connected to the eccentric cam and the shaft by means of a pin coupling so that a circular motion of the cam is forcibly converted into the pivotal movement of the lever and then the pivotal movement is forcibly converted into the reciprocal movement of the shaft. Therefore, according to the feature of the invention, there is no need to provide spring means for urging the lever in one direction to perform the reciprocal movement, whereby the operational energy therefor can be remarkably reduced.

DETAILED DESCRIPTION OF THE PREFERRED EMBODIMENTS

Figure 1:
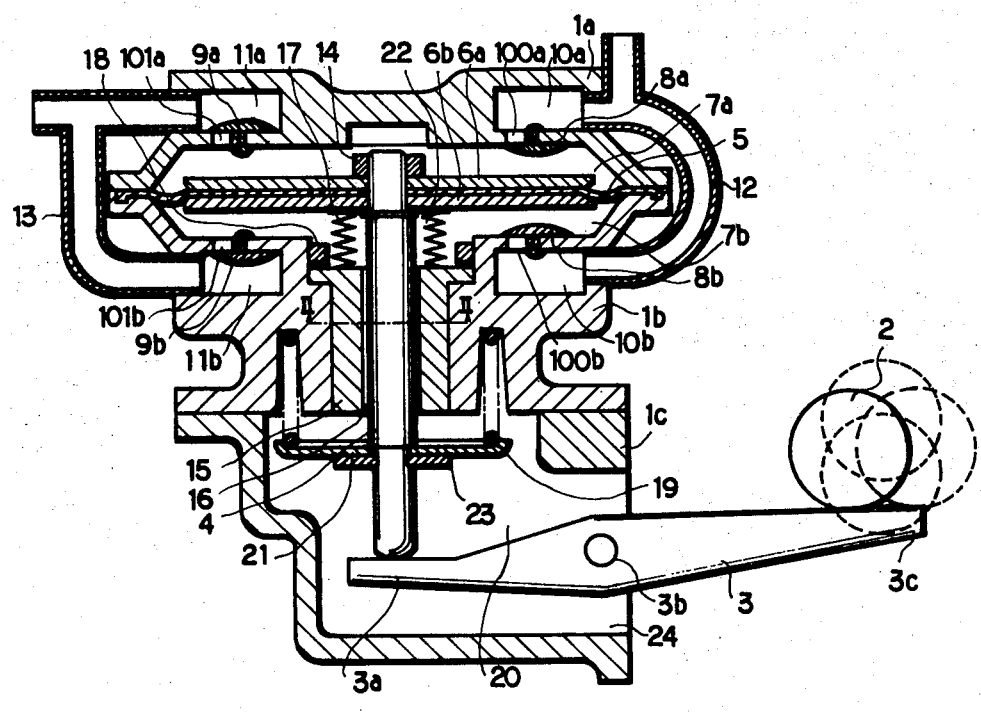
FIG. 1 is a sectional view showing an air pump of a first embodiment of the present invention.
Figure 2:
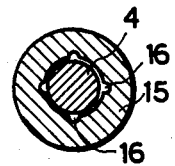
FIG. 2 is a sectional view of a bushing taken along a line II — II in FIG. 1.
Figure 3:
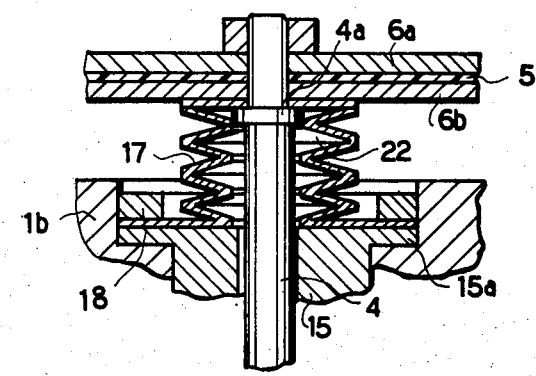
FIG. 3 is an enlarged sectional view showing a detailed construction of a bellows and its associated parts.

Referring to FIGS. 1 to 3 showing a first embodiment of a diaphragm type air pump according to the present invention, numerals 1a, 1b and 1c designate first to third housings of the pump coupled to a side portion of engine (not shown). The third housing 1c receives a lever 3 which is pivotal about a pin 3b held by the housing 1c. An outer end 3c of the lever 3 is in an abutting engagement with an eccentric cam 2 driven by the engine. The eccentric cam 2 is, for example, formed on a crankshaft of the engine.

A diaphragm 5 is interposed between the first and second housings 1a and 1b at its outer periphery, so that first and second diaphragm chambers 7a and 7b are air-tightly formed at both sides of the diaphragm 5. To the diaphragm 5 are fixed first and second retainers 6a and 6b at the both sides thereof.

A shaft 4 is fixed to the diaphragm 5 as well as the retainers at its upper end by means of a nut 14, extends through a through hole formed in a bushing 15 provided in the second housing 1b, and abuts on the inner end 3a of the lever 3 at its lower end, so that a pivotal movement of the lever 3 is transmitted to the diaphragm 5 through the shaft 4.

Adjacent to the diaphragm chambers 7a and 7b, first and second inlet chambers 10a and 10b are respectively formed in the first and second housings 1a and 1b and the inlet chambers 10a and 10b are connected with each other through an inlet pipe 12 and communicated with the atmosphere therethrough. First and second inlet openings 100a and 100b are formed in the respective housings 1a and 1b for operatively communicating the first and second inlet chambers 10a and 10b with the respective first and second diaphragm chambers 7a and 7b. To control the communication between the inlet chambers and the diaphragm chambers, first and second inlet valve members 8a and 8b are provided in such a manner that air is drawn into the diaphragm chambers 7a and 7b when the pressure in the inlet chambers 10a and 10b is higher than that in the diaphragm chambers 7a and 7b because of the expansion thereof.

Adjacent to the diaphragm chambers 7a and 7b, first and second outlet chambers 11a and 11b are likewise formed in the first and second housings 1a and 1b, and the outlet chambers 11a and 11b are connected with each other through an outlet pipe 13 and communicated to a secondary air injection nozzle (not shown) provided in an exhaust pipe of the engine. First and second outlet openings 101a and 101b are formed in the respective housings 1a and 1b for operatively communicating the diaphragm chambers 7a and 7b with the respective outlet chambers 11a and 11b. To control the communication between the diaphragm chambers and the outlet chambers, first and second outlet valve members 9a and 9b are provided in such a manner that the air in the diaphragm chambers are pumped out to the pipe 13 when the pressure in the diaphragm chambers 7a and 7b becomes higher than that in the outlet chambers 11a and 11b because of the contraction thereof.

The inner periphery of the through hole of the bushing 15, through which the shaft 4 extends, is formed with a plurality of axially extending grooves 16 as best shown in FIG. 2 a function of which will be explained later.

Numeral 17 designates an elastic bellows disposed in the second diaphragm chamber 7b and surrounding a portion of the shaft 4. As best shown in FIG. 3, the upper portion of the bellows 17 is interposed between the second retainer 6b and an enlarged section 4a of the shaft 4, while the lower portion thereof is likewise interposed between the upper flanged portion 15a of the bushing 15 and an O-ring 18, so the upper and lower portions of the bellows 17 are respectively air-tightly fixed to the retainer 6b and the bushing 15 and thereby the diaphragm chamber 7b outside of the bellows is air-tightly isolated from the inside (bellows chamber) 22 of the bellows 17.

Numeral 19 designates a compression coil spring disposed in a lever compartment 20 of the housing 1c and held between the second housing 1b and a retainer 21 fixedly secured to the shaft 4 by means of a washer 23 for urging the shaft 4 towards the inner end 3a of the lever 3.

The third housing 1c has an open end 24 through which the inner (lever) compartment 20 is communicated with a crankcase (not shown) of the engine.

When the eccentric cam 2 is driven by the engine and thereby rotated, the lever 3 performs the pivotal movement about the pin 3b. The pivotal movement thereof is transmitted to the diaphragm 5 through the shaft 4, so that the diaphragm performs the reciprocal movement in the diaphragm chambers 7a and 7b. The diaphragm chambers 7a and 7b are thereby alternately expanded and contracted. In accordance with the reciprocal movement of the diaphragm 5, that is, the expansion and contraction of the diaphragm chambers 7a and 7b, air is alternately introduced (drawn) into the first and second diaphragm chambers 7a and 7b through the inlet pipe 12, the respective inlet chambers 10a and 10b and inlet openings 100a and 100b. And the air is alternately pumped out from the diaphragm chambers 7a and 7b through the respective outlet openings 101a and 101b and the outlet chambers 11a and 11b to the outlet pipe 13.

As noted from the above operation, the air pump of the present invention can pump out the air whose amount is twice as large as that pumped out from an air pump having one diaphragm chamber. It should be also noted that when the amount of air pumped out from the air pump of the invention is the same as that from the air pump having one diaphragm chamber, the effective area of the diaphragm 5 can be reduced about by half and thereby the air pump can be made in a smaller construction.

In accordance with the reciprocal movement of the diaphragm 5, the bellows 17 and the bellows chamber 22 are likewise expanded and contracted. With the expansion and contraction of the bellows chamber 22, the air is easily and alternately drawn into and forced out from the bellows chamber 22 through the axially extending grooves 16.

It is therefore apparent that the expansion and contraction of the bellows chamber 22 give little resistance against the reciprocal movement of the shaft 4. Since the lever compartment 20 of the housing 1c is communicated with the engine crankcase through the open end 24, the compartment 20 is filled with a large amount of engine oil mist of vapour. A portion of the mist or vapour is forced into the grooves 16 and the chamber 22 together with the air drawn into the chamber 22 owing to the expansion thereof. As above, lubrication between the shaft 4 and the bushing 15 is forcibly carried out by the expansion and contraction of the bellows chamber 22.

Figure 4:
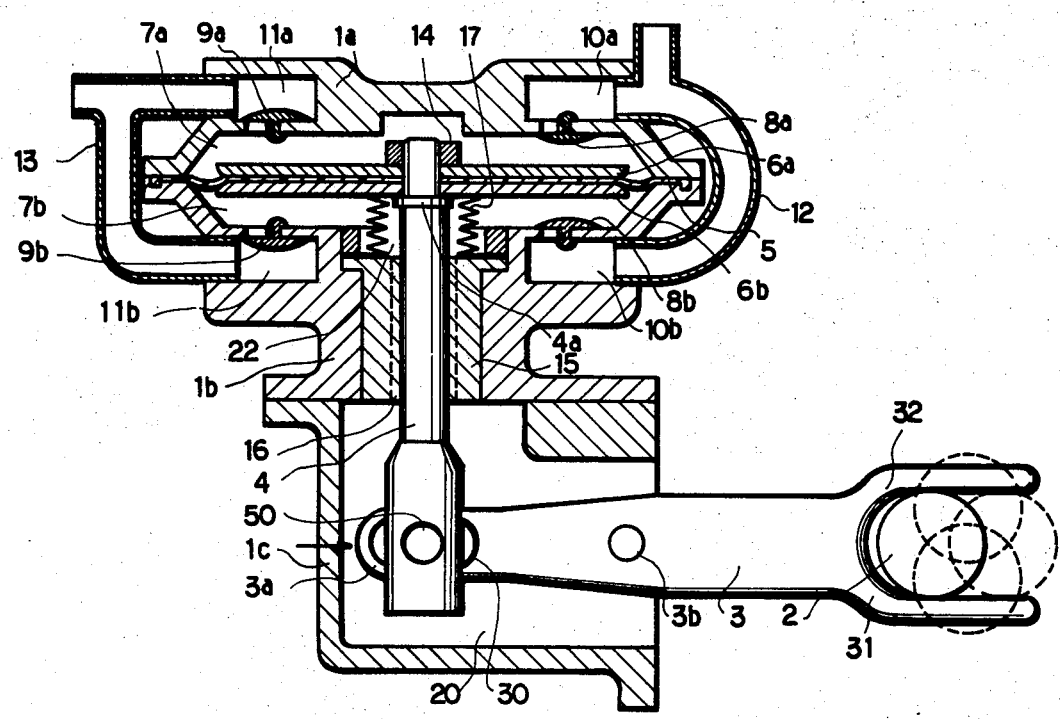
FIG. 4 is a sectional view showing an air pump of a second embodiment of the invention.

In FIG. 4 showing a second embodiment of the invention, the same reference numeral designates the same or equivalent parts to that shown in FIG. 1. The second embodiment will be explained by pointing out the differences between first and second embodiments.

Figure 5:
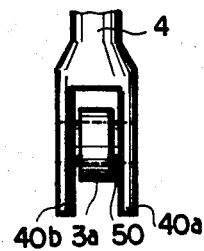
FIG. 5 is a fragmentary end view of a lever and shaft when viewed in a direction designated by an arrow in FIG. 4.

The lever 3 is pivotally fixed to the third housing 1c and the inner end 3a thereof is received in the compartment 20. The inner end 3a is provided with a slot 30 into which a pin 50 is inserted. Both ends of the pin 50 is held by parallel legs 40a and 40b of a forked end of the shaft 4 as best shown in FIG. 5. The lever 3 has an outer forked end having parallel legs 31 and 32 within which an eccentric circular cam 2 is received. Here, a term "a pin-coupling" is used in the specification to designate the couplings between the inner end 3a of the lever 3 and the lower end of the shaft 4 and between the outer end of the lever 3 and the cam 2 wherein the pivotal movement of the lever 3 is forcibly converted into the reciprocal movement of the shaft 4 and the circular motion or the reciprocal motion of the cam 2 is forcibly converted into the pivotal movement of the lever 3.

According to the second embodiment just described, since the lever 3 is connected with the shaft 4 and the cam 2 through the pin couplings, a spring for urging the lever 3 in one direction can be eliminated. And since the spring for urging the lever 3 can be eliminated, operational energy for the air pump can be reduced.

Figure 6:
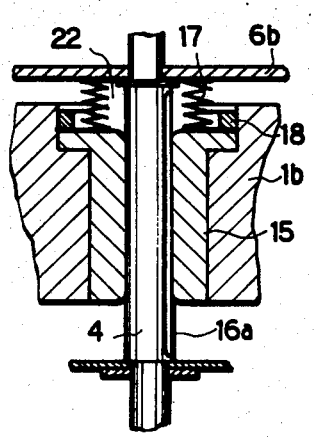
FIG. 6 is an enlarged sectional view showing a modification of the invention.

FIG. 6 shows a modification of the invention. In the modification, a plurality of axially extending grooves formed on the inner surface of the bushing are eliminated, and instead at least one longitudinally extending groove 16a is formed on the outer surface of the shaft 4 so that the same result can be obtained in the modification.

What is claimed is:

1. A diaphragm type air pump comprising:
   first and second housing means;
   a diaphragm interposed between said first and second housing means to respectively form first and second diaphragm chambers at both sides thereof;
   first and second inlet openings respectively formed on said first and second housing means for operatively communicating said diaphragm chambers with the outside thereof;
   first and second outlet openings respectively formed on said first and second housing means for operatively communicating said diaphragm chambers with an outlet pipe of the air pump;
   first and second inlet valve members respectively associated with said first and second openings for opening and closing the same in accordance with expansion and contraction of said diaphragm chambers;
   first and second outlet valve members respectively associated with said first and second outlet openings for opening and closing the same in accordance with expansion and contraction of said diaphragm chambers;
   a shaft connected at one end to said diaphragm and extending through said second diaphragm chamber;
   a bushing fixed to said second housing means and having a hole through which said shaft extends, an axially extending groove being formed on one of the inner surface of said hole and the outer surface of said shaft;
   a bellows disposed in said second diaphragm chamber and surrounding a portion of said shaft, one end of said bellows being air-tightly fixed to said diaphragm and the other end being air-tightly fixed to said bushing to form a bellows chamber inside of said bellows, whereby said diaphragm chamber outside of said bellows being air-tightly isolated from said bellows chamber;
   said second housing means having a lever compartment into which the other end of said shaft protrudes from said bushing;
   a lever pivotally fixed to said second housing means, the inner end being disposed in said compartment and operatively connected to said other end of said shaft, and the outer end of said lever being operatively connected to an eccentric cam formed on a crankshaft of said engine, whereby said lever is driven by said eccentric cam to perform a pivotal movement,
   said pivotal movement of said lever being transmitted to said diaphragm through said shaft so that said diaphragm is reciprocally moved in said diaphragm chambers, and thereby said diaphragm chambers are respectively expanded and contracted in accordance with the reciprocal movement of said diaphragm for alternately drawing air thereinto through the respective inlet openings and forcing out the drawn air therefrom through the respective outlet openings.

2. A diaphragm type air pump as set forth in claim 1, wherein said lever compartment is communicated with a crankcase of said engine filled with engine-oil mist, whereby lubrication between said shaft and bushing is forcibly carried out through said groove in accordance with the expansion and contraction of said bellows chamber.

3. A diaphragm type air pump as set forth in claim 1, wherein said outer end of said lever is of a forked end having two parallel legs within which said eccentric cam is operatively received,
   said inner end of said lever is formed with a slot, and
   said other end of said shaft is of a forked end having parallel legs for operatively receiving said inner end of said shaft, said other end having a pin held by said legs at both sides and said pin extending through said slot formed on said inner end.

* * * * *